(12) United States Patent
Wainwright et al.

(10) Patent No.: US 6,807,770 B2
(45) Date of Patent: Oct. 26, 2004

(54) LOW PRESSURE AEROPONIC GROWING APPARATUS

(75) Inventors: Robert E. Wainwright, Longmont, CO (US); W. Michael Bissonnette, Boulder, CO (US); Richard J. Stoner, II, Berthoud, CO (US)

(73) Assignee: AeroGrow International, Inc., Boulder, CO (US)

( * ) Notice: Subject to any disclaimer, the term of this patent is extended or adjusted under 35 U.S.C. 154(b) by 0 days.

(21) Appl. No.: 10/253,505

(22) Filed: Sep. 24, 2002

(65) Prior Publication Data

US 2004/0055213 A1 Mar. 25, 2004

(51) Int. Cl.$^7$ ............................................... A01G 31/00
(52) U.S. Cl. .................. 47/62 A; 47/59 R; 239/222.11; 239/223; 239/214
(58) Field of Search ............... 47/62 A, 59, 62 R, 47/62 N; 239/222.11, 223, 548, 566, 263.1, 214; 222/410

(56) References Cited

U.S. PATENT DOCUMENTS

| | | | | |
|---|---|---|---|---|
| 1,594,306 A | * | 7/1926 | Lenz et al. | |
| 2,994,482 A | * | 8/1961 | Valois et al. | |
| 3,026,046 A | * | 3/1962 | Wickham et al. | |
| 3,599,877 A | * | 8/1971 | Goldschmied | 239/562 |
| 3,875,598 A | * | 4/1975 | Havens | 239/542 |
| 3,882,634 A | * | 5/1975 | Dedolph | 47/1.2 |
| 3,992,809 A | * | 11/1976 | Chew | 47/62 |
| 4,514,930 A | * | 5/1985 | Schorr et al. | 47/60 |
| 4,815,662 A | * | 3/1989 | Hunter | 239/222.17 |
| 4,869,019 A | * | 9/1989 | Ehrlich | 47/62 |
| 4,948,295 A | * | 8/1990 | Pramsoler | 405/44 |
| 5,005,766 A | * | 4/1991 | Heiner | 239/214 |
| D402,296 S | * | 12/1998 | Schorr | D15/10 |
| 6,021,602 A | * | 2/2000 | Orsi | 47/62 |

FOREIGN PATENT DOCUMENTS

| | | | | |
|---|---|---|---|---|
| JP | 03178807 | * | 6/1991 | .......... A01G/31/00 |
| SU | 682275 A | * | 3/1977 | ............ B05B/3/12 |
| SU | 1323134 A | * | 7/1987 | ............ A01M/7/99 |

OTHER PUBLICATIONS

PENNSTATE, Agricultural and Biological Engineering, Sprayer Nozzles, Donald R. Daum, 4 pages, B–78, PSU/90.*
Plant Root Engineering, http://www.pe.ipw.agrl.ethz.ch/pages/roots/aeroponics3.htm, 3 pages, Feb. 7, 2001.*

* cited by examiner

Primary Examiner—Peter M. Poon
Assistant Examiner—Andrea M. Valenti
(74) Attorney, Agent, or Firm—Ruth Eure; Laura L. Conley

(57) ABSTRACT

An aeroponic growing apparatus is provided which comprises a novel low pressure liquid nutrient delivery system generated by centrifugal force utilizing a rotating cylinder device. The rotating cylinder device distributes liquid nutrient solution to the roots of plants by use of centrifugal force, thereby eliminating the need for a high pressure pump and nozzles. The geometrical shape of the enclosed root growth chamber is such that it allows for fractionated droplets to ricochet in multiple random directions thus completely surrounding the plant roots in 360° in any plane.

3 Claims, 6 Drawing Sheets

LOW PRESSURE AEROPONIC GROWING APPARATUS

FIELD OF THE INVENTION

The present invention relates to the field of cultivation of plants in controlled environments, and more specifically to the field of aeroponic cultivation of plants.

BACKGROUND OF THE INVENTION

The increase of human population in geographic areas of environmentally adverse conditions has given rise to the need for an efficient, economical and easy to use apparatus to cultivate nutritious edible plants indoors for human consumption. The present invention also provides year-round cultivation in areas where seasonal changes prevent or limit outside growing.

The field of indoor cultivation of plants using soil-less units such as hydroponic or aeroponic apparata has arisen to address this need. As an example, U.S. Pat. No. 6,000,173 discloses a hydroponic unit, which delivers a controlled amount of nutrient solution to the roots of the plants in order to most efficiently cultivate their growth. Although the design and functioning of the '173 apparatus is significantly different than that of the present invention, some of the basic principles of soil-less cultivation set forth therein pertain to the present invention. It is important that the delivery of the liquid nutrients to plant roots not exceed a maximum level, nor should the plant roots be deprived of nutrient and allowed to dry for too long a period of time. If over-watering occurs, the plant may die or have its growth inhibited from root rot. Allowing the roots of the plant to be dry for too long results in dehydration and starving the plant. Thus, an accurate method of delivering controlled amounts of liquid nutrient to the roots of a plant is desirable. The present invention provides an improvement over the '173 device in that it affords a novel, efficient and economical aeroponic low pressure delivery apparatus.

Hydroponic units are generally taken to refer to units in which the roots are submerged in a reservoir of nutrient solution. U.S. Pat. No. 4,332,105 to Nir discloses the development of an aeroponic unit, which introduces the concept of plant roots suspended in a chamber wherein they are misted at periodic intervals with a mixture of air and nutrient solution. This was seen to be a more efficient, accurate and economical method of delivering the nutrient solution. Nir's device relies on the use of nozzles and a pumping system for delivery of liquid nutrients which incorporates a pneumatic pump powerful enough to generate a flow rate high enough to effectively atomize the liquid nutrients and dispense the liquid nutrients through a nozzle to the roots of the plants.

U.S. Pat. No. 4,514,930, describes a method and apparatus for aeroponic growth, which relies on the use of nozzles to distribute the liquid nutrient solution to the roots of the plants utilizing water pressure from any source including a standard household tap as a high pressure source. The precise control of the liquid suction venturi provides an intermittent hydro-atomized spray to the plants.

More recently, U.S. Pat. Nos. 5,136,804 and 5,300,260, for example, describe aeroponic units with complex fog generator units.

U.S. Pat. Nos. Des. 397,280, 402,230, 402,296 and 402,668 refer to designs for the outer shell of the unit.

Also, the above described devices take up large amounts of space, are physically cumbersome and not aesthetically pleasing for the home consumer. A significant degree of expertise or academic interest is required in order to efficiently cultivate plants in these units. This was largely due to the complexity of the pressurized pump system utilized in theses units for high pressure oxygenated spray to the enclosed chamber which were expensive to manufacture, bulky, loud, and complicated to operate and repair. These prior art units could require repair when the nozzles of the spraying units became clogged with scaling due to dissimilar metals in the nozzle assembly or organic matter which results from biological processes involved in plant growth. This potential clogging could result in deficient delivery of the liquid nutrient solution and prevent optimum plant growth. The present invention provides a liquid nutrient delivery system which does not rely on nozzles and therefore eliminates this potential problem.

Prior art aeroponic growth units have contained spraying or misting parts which have generally required pressurized pumps or expensive mist generators to supply the nutrient solution in the form of a mist or fine droplets. The present invention described herein has provided an economical alternative to these designs in that it comprises a low pressure liquid nutrient delivery system based on centrifugal force, which utilizes an inexpensive low pressure pump and low voltage motor in order to deliver liquid nutrient solution to the roots of the plants.

The device of the present invention provides an aeroponic cultivation unit which is aesthetically pleasing to the consumer, and which is economical to manufacture and operate due to the improved novel nutrient delivery system. The nutrient delivery system of the present invention does not require pressurized air or water through a high pressure nozzle to evenly distribute the liquid nutrients to the roots of the plants.

Aeroponic cultivation holds wide appeal in many circles due to its facilitating the growth of fresh, organic herbs, vegetables, fruit and ornamental flowers easily in the home. The apparatus of the present invention provides an aeroponic growing apparatus having a simple, inexpensive, quiet and resilient nutrient delivery system in a compact design allowing for a cost-effective plant growing environment. The instant invention provides important features over prior art devices including providing a system which makes the process of aeroponic cultivation available to any consumer, in a package that is attractive, utilitarian, quiet and convenient to use and can be installed in any home as a domestic appliance. The invention described herein provides such improvements in that it comprises a lightweight, aesthetically pleasing, quiet and convenient to use product. The novel liquid nutrient delivery system is most specifically the component which lowers the cost to facilitate that this appliance may be delivered to consumers at a previously unattainable, affordable price. A further need within the industry is the ability to provide an optimum amount of growing space in these units, which is divided in such a way that the cultivation of different types of plants is facilitated in a more sophisticated and amenable design layout.

SUMMARY OF THE INVENTION

The present invention provides an improvement over the prior art in that the nutrient delivery system consists of a rotating cylinder device which requires a smaller pump and motor than prior art devices and no nozzles to become clogged with organic matter or scaling as discussed above. This feature of the present invention is a low pressure automated liquid nutrient solution delivery system which is used as part of an aeroponic growth unit. The liquid nutrient solution discussed herein is intended to comprise any liquid which enables plant growth. This includes oxygenated or aerated water mixtures which may or may not contain added nutrients The present invention seeks to overcome problems and difficulties associated with former aeroponics systems by incorporating a new design which allows for the cultivation of a number of different types of plants, is presentable, attractive, quiet and convenient to use as a domestic kitchen appliance.

Aeroponic growing of plants provides an effective method of cultivating plants in adverse environmental conditions such as drought or diminished air quality.

The present invention provides an improved apparatus for aeroponic growing of plants which distributes nutrient solution to the plant roots efficiently, quietly and economically.

It is an object of the present invention to provide an apparatus for aeroponic growing of plants which is designed for counter-top use by the consumer.

It is a further object of the present invention to provide an apparatus for aeroponic growing of plants for counter-top use by the consumer, which apparatus comprises a means for varying the height of the plant support member.

It is a further object of the present invention to provide an apparatus for aeroponic growing of plants which has multiple growing chambers for discrete growing of different kinds of plants.

It is a further object of the present invention to provide an apparatus for the aeroponic growing of plants which is economical and easy to use.

It is a further object of the present invention to provide an apparatus for the aeroponic growing of plants which is easily disassembled for cleaning, and in fact, can be cleaned in a household dishwasher.

It is a further object of the present invention to provide a novel, effective and efficient liquid nutrient delivery system.

The invention will be more fully understood and appreciated from the following detailed description taken in conjunction with the accompanying drawings

DETAILED DESCRIPTION OF THE INVENTION

The present invention provides a completely self-contained and independent domestic aeroponic apparatus. Please refer to the accompanying drawings.

The outer shell circumscribes the apparatus in an essentially ovoid or slightly hour-glass configuration. The apparatus forms an enclosed chamber which serves as a root growth chamber and is sized to easily sit on a countertop or other in-home location. The geometric configuration of the enclosed root growth chamber permits fractionated droplets to access all surfaces of the plant roots. The geometric shape of the enclosed root growth chamber is such that it allows fractionated droplets of liquid nutrient to ricochet in random multiple directions thereby completely surrounding the roots in 360° in any plane. The apparatus is approximately 22 inches long, 10 inches wide and 7 inches high. In an alternative embodiment, the variable height plant support member is approximately 3 to 4 inches, so when the variable height plant support member is in place, the unit will be approximately 11 inches high. These dimensions are not critical and are to be interpreted as approximations only. The apparatus is covered with an escutcheon, which holds plant support member or members. The outer shell can be made of any moldable, opaque plastic. It is important that the plastic be opaque, to contribute to the aesthetic qualities of the apparatus, as well as to prevent the growth of algae. It is also important that the plastic be heat-resistant since it is intended that the outer shell can be placed into an ordinary household dishwasher for cleaning.

An alternative embodiment includes a variable height plant support member which can be inserted between the outer shell and the escutcheon to accommodate the increasing size of the growing plants. It is expected that this feature will be more fully described and claimed in a later filed patent application.

Figure 1:
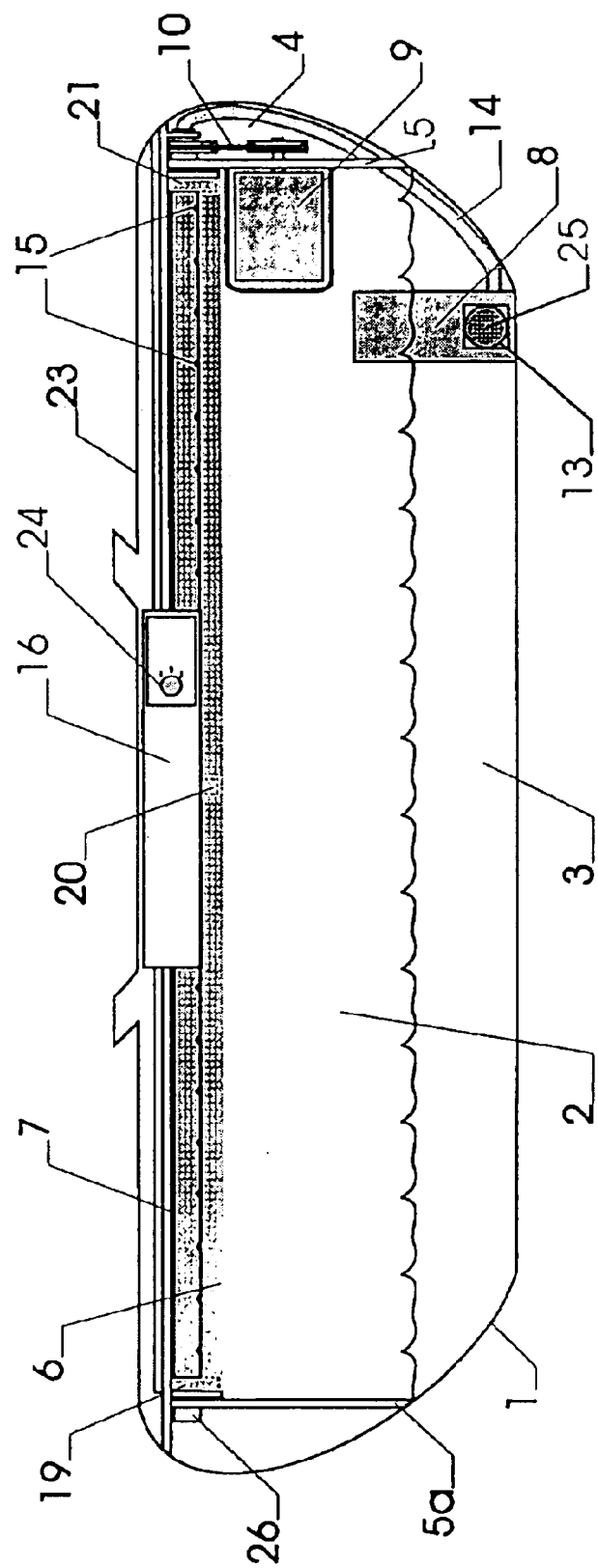
FIG. 1 is a side cut-away view of the apparatus of the present invention.
Figure 5:
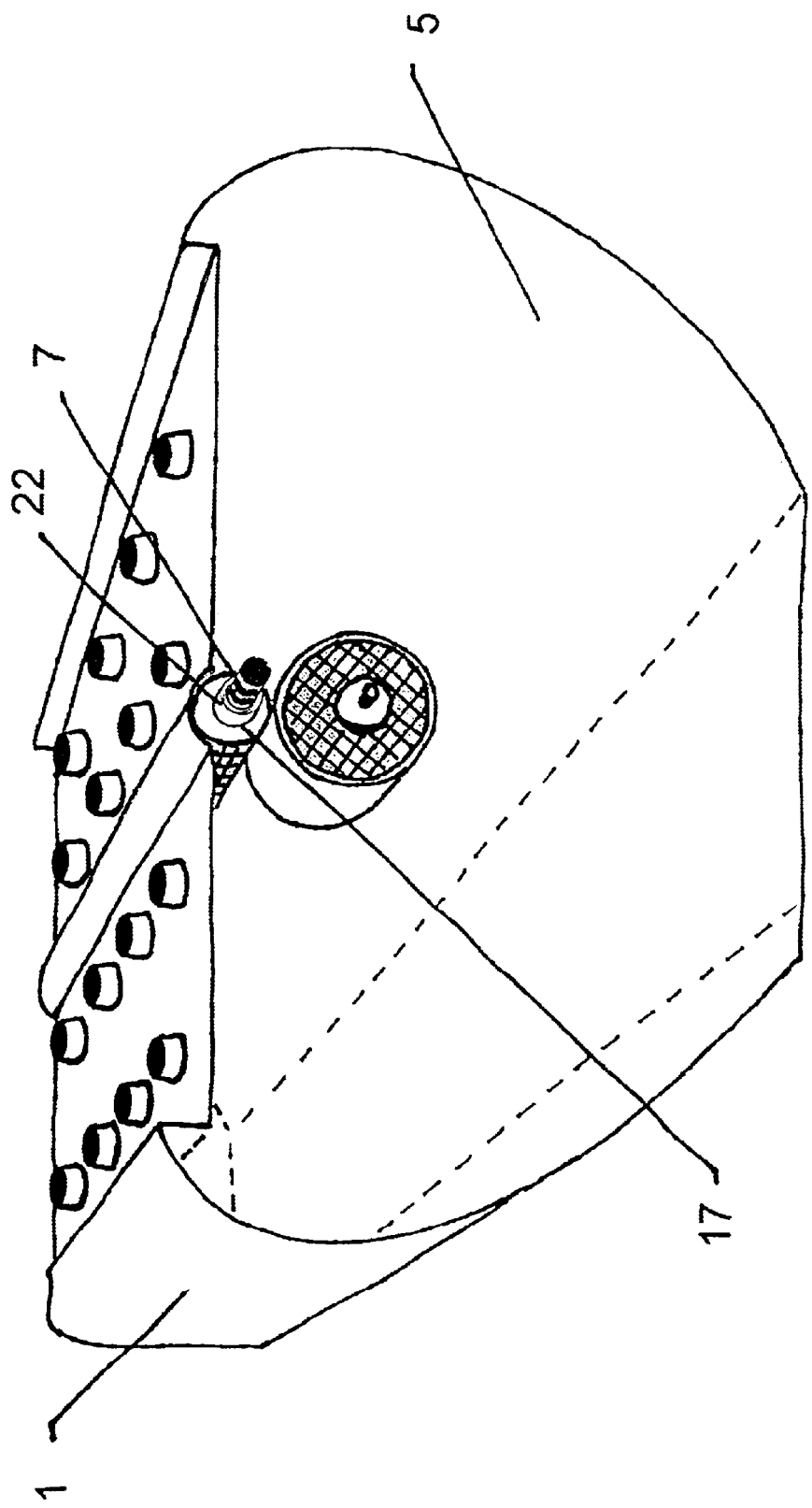
FIG. 5 is an end view of the vertical partition which creates the water tight compartment of the apparatus of the present invention.

The outer shell 1 forms an enclosed chamber with convexly curved sides and a flattened bottom as shown in FIGS. 1 and 5. The flattened bottom allows for stable situation on a flat surface. The convexly curved sides allow for easy collection of the liquid nutrient solution for recirculation. The enclosed chamber described by outer shell 1 contains a lower portion which comprises the liquid nutrient solution reservoir 3 and a vertical partition 5 at one end to form water tight compartment 4, which houses motor 9. Vertical partition 5a supports sealed end 26 of stationary perforated tube 7 at the end of the enclosed chamber opposite motor 9.

Figure 2:
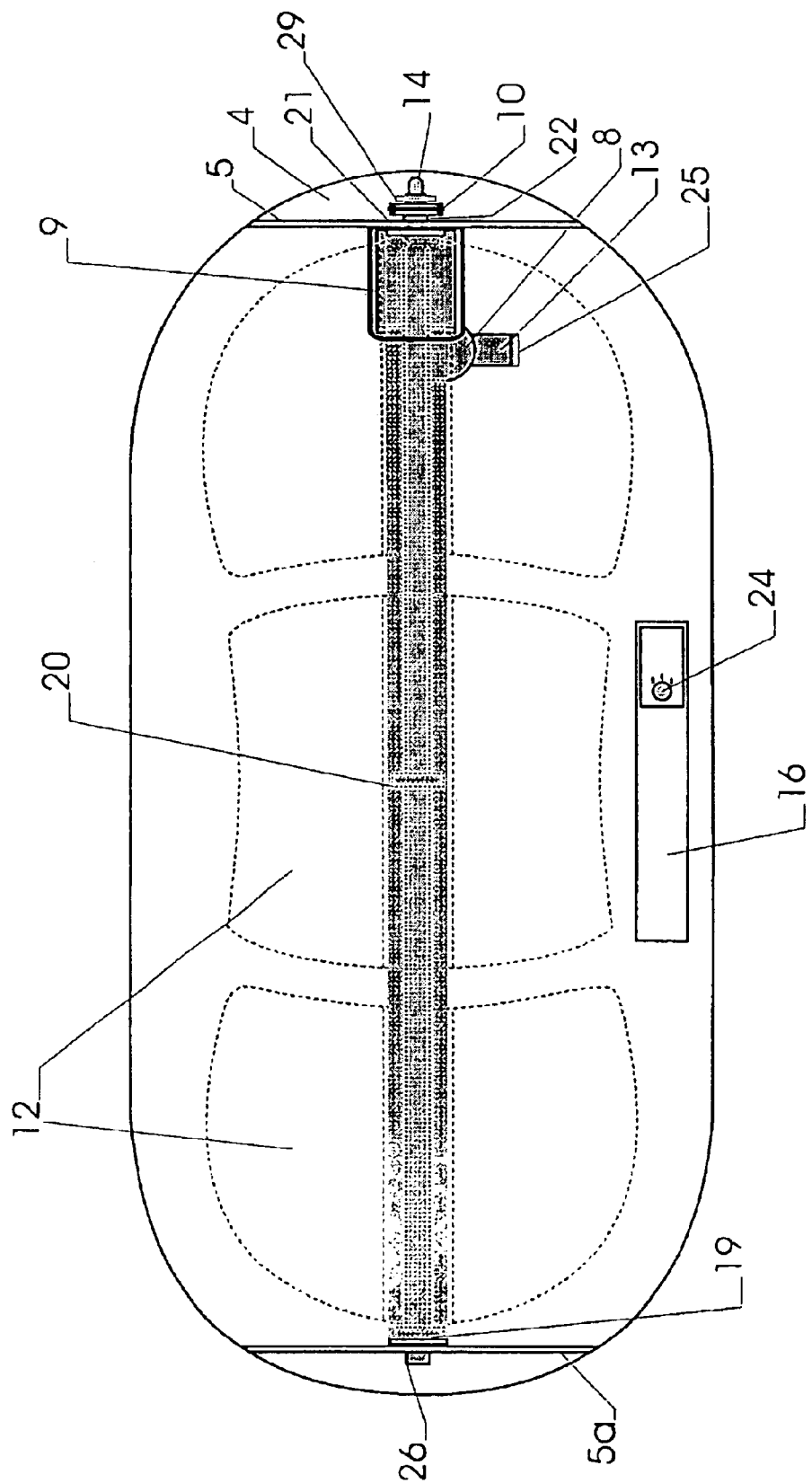
FIG. 2 is a top view of the device of the present invention showing the tripartite growing chambers and other features.
Figure 3:
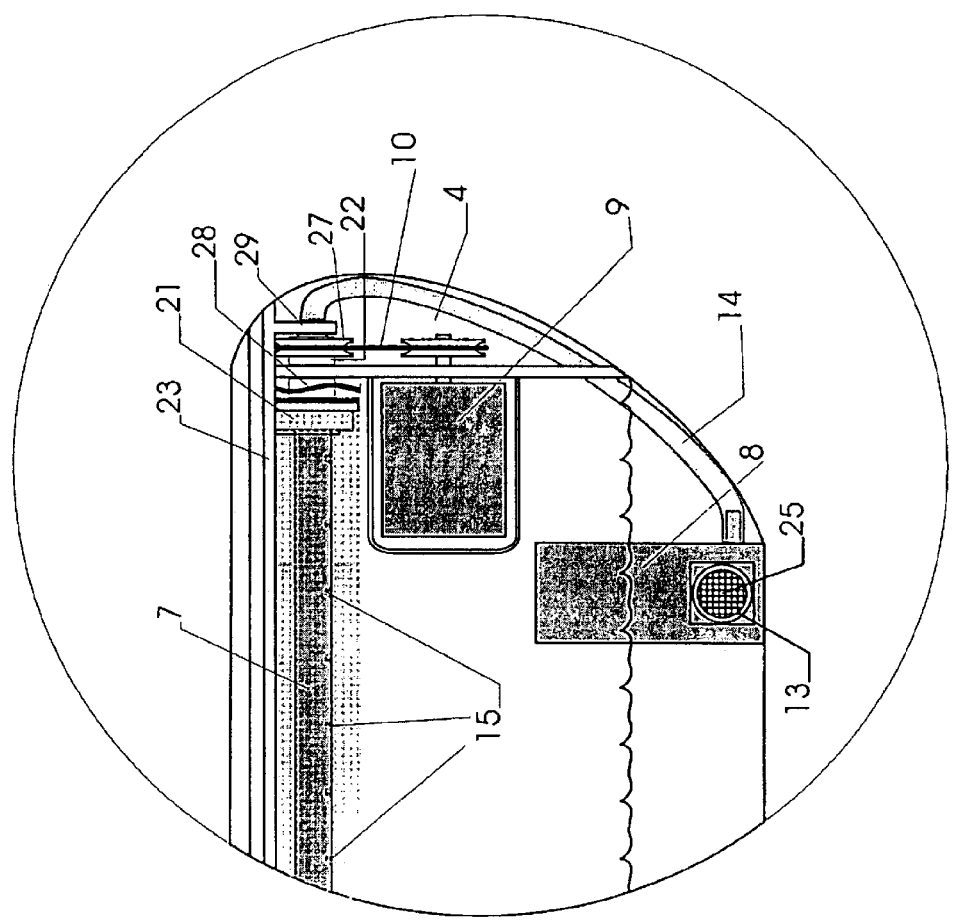
FIG. 3 is an enlargement of FIG. 1 showing more detail near the motor assembly.
Figure 4:
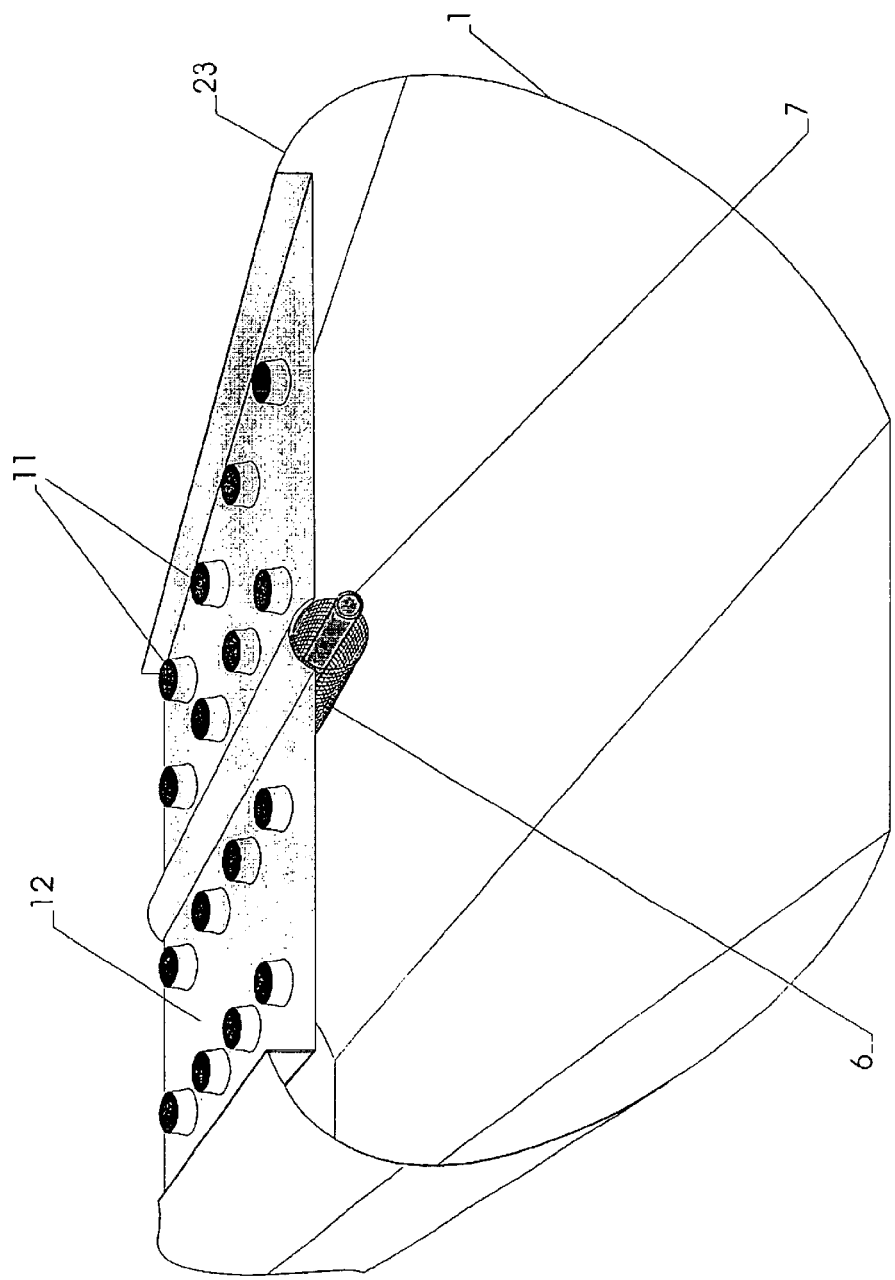
FIG. 4 is a perspective cut-away view of the apparatus of the present invention.
Figure 6:
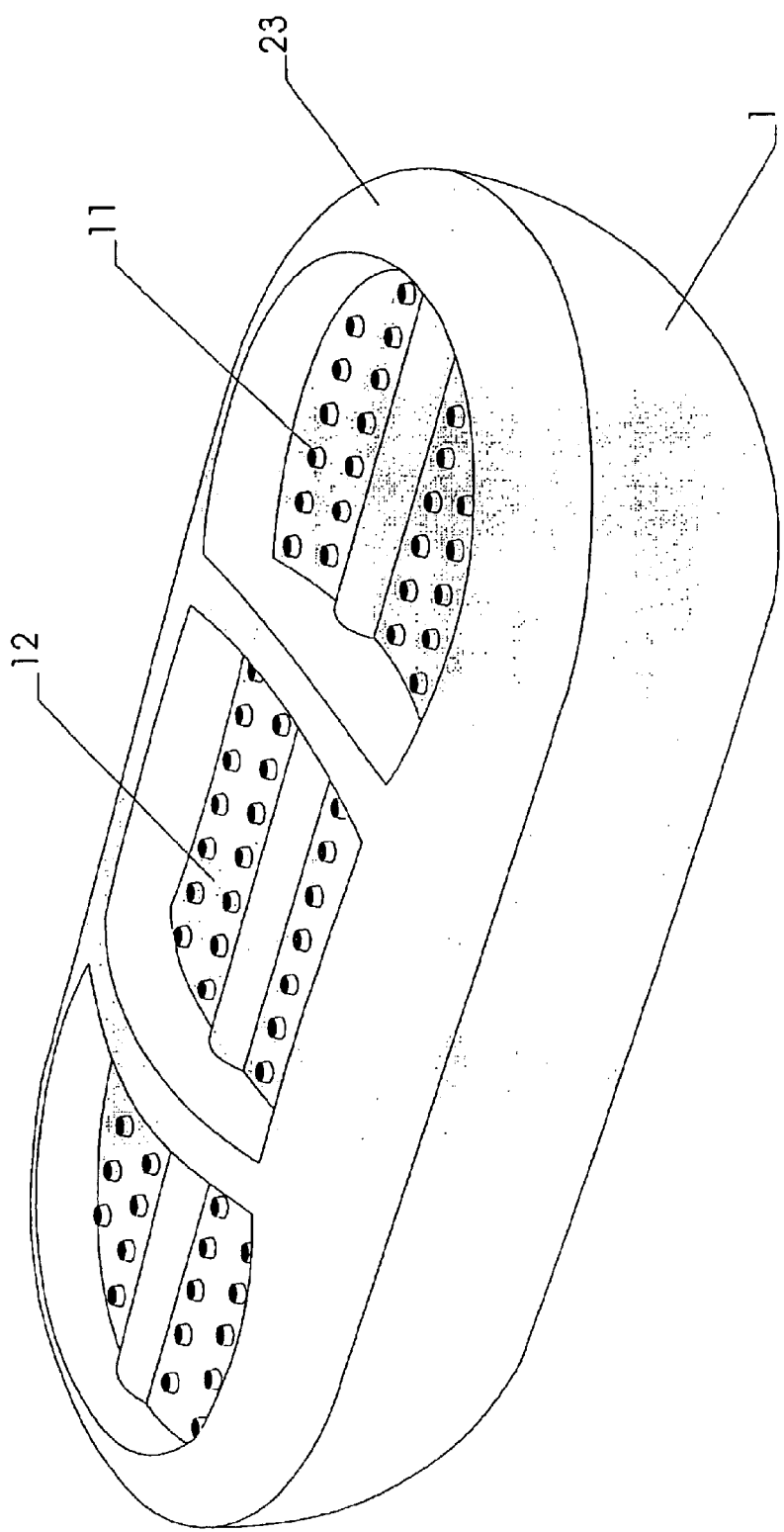
FIG. 6 is a perspective view of the outside of the apparatus of the present invention showing a tripartite plant support member configuration.

Turning now to FIG. 2, the outer shell is covered with escutcheon 23 which holds timer controller board 16 and provides a manual control 24 for the user to adjust the length of time between cycles of liquid nutrient solution delivery. FIG. 3 shows escutcheon 23 is also equipped with liquid nutrient solution feed tube support 29, which support 29 serves to support the juncture of the liquid nutrient solution feed tube 14 to stationary perforated tube 7 and to support the end of stationary perforated tube 7. Escutcheon 23 also serves to support plant support members 12, shown in FIGS. 4 and 6. Plant support members 12 can be easily lifted and opened to permit inspection of the propagating plants. Plant support members 12 contain a plurality of plant bearing openings 11 interspersed over its entirety. These are shown in FIGS. 4 and 6. A plurality of plant support members 12 are provided to provide for efficient growing and easy inspection of a variety of plants. As an example, a tripartite configuration of escutcheon 23 is shown in FIG. 6. An alternative embodiment provides for a single plant support member for growing of a single species crop.

FIG. 5 shows vertical partition 5 comprising an aperture 17 which permits the passage of liquid nutrient solution feed tube 14 from pump 8 to stationary perforated tube 7. The relationship of pump 8 to liquid nutrient solution feed tube 14 is best seen in FIG. 3. Vertical partition 5 can be molded to form a recessed area to accommodate the motor 9, as shown in FIG. 3.

The plant bearing openings 11 are formed as vertical, tubular plant supporting cylinders having a smooth surface defining a curved or arcuate relationship with the plant support member 12, as shown in FIG. 4. This curved surface prevents destruction of delicate plant roots when the plants are transplanted or removed from the unit. The rim of the opening bears the weight of the leafy portion of the plant during propagation, allowing the roots to hang free to receive liquid nutrient solution.

The low pressure liquid nutrient solution delivery system is a novel feature of the present invention. The low pressure liquid nutrient solution delivery system comprises a rotating cylinder device which is situated in the upper portion of the root growth chamber of such an apparatus and supplies nutrient solution to the roots of the plants at periodic intervals. See FIG. 4. The rotating cylinder device consists of stationary perforated tube 7 surrounded by rotating cylindrical mesh tube 6. Perforations 15 in stationary perforated tube 7 can be seen clearly in FIG. 3. Perforations 15 are sized so as to optimize the flow of liquid nutrient solution issuing therefrom for capture by the rotating cylindrical mesh tube 6. Perforations 15 are not shown in FIG. 4 to allow clear illustration of stationary perforated tube 7 and rotating cylindrical mesh tube 6. In operation, stationary perforated tube 7 receives liquid nutrient solution at one end from feed tube 14, which is fed by pump 8. FIG. 2 shows that stationary perforated tube 7 is sealed at end 26. End 26 is the end of stationary perforated tube 7 which is opposite the end which receives feed tube 14. Pump 8 is equipped with an intake tube 13, which is fitted with filter 25 at its orifice. See FIG. 3. A pump suitable for use in the present invention would be a gravity fed submersible pump with an output of approximately 20 psi or lower. Other kinds of pumps can be used, as well, such as siphon pumps or impeller pumps. A gravity fed submersible pump was chosen for this embodiment because it was economical to manufacture, and quiet to operate.

An alternative embodiment comprises the use of an Archimedes' screw or other mechanical water uptake system such as a wick arrangement to supply the liquid nutrient solution to the rotating cylinder device. It is expected that this alternative embodiment will be described and claimed in a later filed patent application.

The liquid nutrient solution drips out of perforations 15 in stationary perforated tube 7 by gravity onto a rotating cylindrical mesh tube 6 which is concentric with stationary perforated tube 7. Stationary perforated tube 7 is coaxial with and inside of rotating cylindrical mesh tube 6. See FIG. 4. Cylindrical mesh tube 6 is made of fine mesh material which has appropriately sized apertures and is made of material which is stiff enough to maintain its cylindrical form. Many materials are suitable for this purpose as long as they are not reactive with the liquid nutrient solution or harmful to the propagating plants. Nylon, fiberglass or other plastic or metal screen, for example can be used for this purpose. Rotating cylindrical mesh tube 6 is also supported at both ends and in the center by bushings 19, 20 and 21. See FIG. 2. Bushing 21 fits inside the end of rotating cylindrical mesh tube and further comprises protrusion 22, which extends beyond the end of rotating cylindrical mesh tube 6 to engage pulley 27 for receiving drive belt 10 of motor 9. Protrusion 22 also accommodates thrust bearing washer 28 which helps to maintain the integrity of the rotational motion of rotating cylindrical mesh tube 6 and drive belt 10. This is seen in FIG. 3. Motor 9 can be any of a variety of motors. It has been found that a 12 volt motor with a no load speed of 2500–3500 r/min is suitable for application in the present invention, although any suitable motor can be used. An alternative embodiment could include a direct drive motor.

Cylindrical mesh tube 6 rotates at a speed sufficient to generate enough centrifugal force to cause the liquid nutrient solution issuing from rotating cylindrical mesh tube 6 to fractionate into droplets of about 50 to 100 microns in size. The droplets should be sized so as to permit chemical bonding between oxygen species and liquid nutrient solution. The fractionated droplets leave the mesh tube and are ejected outward in all directions to nourish the plant roots. The excess nutrient solution simply falls down into the reservoir of nutrient solution for reuptake by pump 8.

The operation of the apparatus is controlled by a timer controller board 16 which comprises an electronic clock to determine the appropriate timing for turning the motor on and off and turning the pump on and off. The timer controller board 16 also comprises an electronic counter for tracking the number of motor cycles to alert the user when to replenish or change liquid nutrient solution. Also, in a self-illuminated embodiment, timer controller board 16 will control turning the lights on and off. Typically, timer controller board 16 will turn on pump 8 to begin flow of liquid nutrient solution to stationary perforated tube 7. The timer controller board 16 will then turn on motor 9 to actuate drive belt 10 to turn rotating cylindrical mesh tube 6 to deliver liquid nutrient solution to the roots of the plants. This liquid nutrient delivery cycle will last for a short duration, typically about 3 seconds. The interval between liquid nutrient delivery cycles can be adjusted from a few minutes to about 30 minutes or longer, according to the needs of the plants being grown. An exemplary timer controller board will run on 12 volts dc and drive the motor and the pump. The timer controller board 16 is programmed to allow for the pump to begin pumping a pre-determined time before the motor is turned on. Other timing mechanism could also be utilized in the apparatus of the present invention. Such mechanisms could include a water clock, for example A suitable location for the placement of the apparatus is one having adequate light and appropriate temperature for the plants to be grown. After finding a suitable location for the apparatus, the user will mix the liquid nutrient solution according to directions suitable for the plants to be grown. Then the user will pour liquid nutrient solution into liquid nutrient solution reservoir 3. The user will then insert plant cuttings or a seed into a seed holder such as a fibrous fabric envelope or fibrous plug, for example, and then insert the seed holder containing the seed into the plant bearing openings 11. It is important that the seed holder be comprised of material which enables air to circulate around the seed, as well as make the seed surface available for liquid nutrient solution uptake. The user will then turn the unit on, and the plants will grow.

While the present invention has been described with respect to specific embodiments, it is be understood that the specific embodiments recited herein are exemplary in nature and the invention is not to be limited thereto. Various modifications and substitutions will be obvious to the skilled artisan and such modifications and substitutions are considered to fall within the spirit and scope of the present invention. The scope of the following claims is to be accorded the broadest interpretation so as to encompass all such modifications and substitutions of equivalent structures and functions.

What is claimed is:

1. An aeroponic growing apparatus for growing plants comprising:

a. an outer shell forming an enclosed chamber, said outer chamber having convexly curved sides and a flat bottom for enclosing the root portions of plants, said enclosed chamber geometrically configured to permit fractionated droplets of liquid nutrient solution to completely surround plant roots, and said outer shell forming a liquid nutrient solution reservoir;

b. an essentially flat plant support member defining a generally flat top surface interspersed with plant bearing openings to receive plants above the root portions thereof or to hold a seed holder containing a seed;

c. a vertical partition to form a water tight chamber for housing a motor;

d. a pump;

e. a motor;

f. a timer controller board;

g. a liquid nutrient delivery system comprising a rotating cylinder device further comprising: a stationary perforated tube surrounded by a rotating cylindrical mesh tube, said rotating cylindrical mesh tube being substantially circular in cross-section, said stationary perforated tube receiving liquid nutrient solution from the pump; wherein said liquid nutrient solution drips out of perforations in the stationary perforated tube by gravity onto the cylindrical mesh tube which is concentric with stationary perforated tube, said stationary perforated tube being coaxial with and inside of said cylindrical mesh tube; said cylindrical mesh tube being driven by the motor to rotate, which rotation creates centrifugal force which causes the liquid nutrient solution issuing from rotating cylindrical mesh tube to fractionate into droplets, which fractionated droplets leave the mesh tube and are ejected outward to nourish plant roots; and said enclosed chamber permitting access to plant root surfaces by the fractionated droplets.

2. The apparatus of claim wherein the plant support member is divided into a plurality of growing sections.

3. The apparatus of claim wherein the plant support member is divided into three growing sections.

* * * * *

UNITED STATES PATENT AND TRADEMARK OFFICE
CERTIFICATE OF CORRECTION

PATENT NO.   : 6,807,770 B2
DATED        : October 26, 2004
INVENTOR(S)  : Robert E. Wainwright, W. Michael Bissonnette and Richard J. Stoner II It is certified that error appears in the above-identified patent and that said Letters Patent is hereby corrected as shown below:

Column 8,
Line 15, please insert -- 1 -- between "claim" and "wherein".
Line 17, please insert -- 2 -- between "claim" and "wherein".

Signed and Sealed this

Eighteenth Day of October, 2005

JON W. DUDAS
*Director of the United States Patent and Trademark Office*